(12) United States Patent
Wang et al.

(10) Patent No.: US 6,883,051 B2
(45) Date of Patent: Apr. 19, 2005

(54) EFFICIENT BUS UTILIZATION IN A MULTIPROCESSOR SYSTEM BY DYNAMICALLY MAPPING MEMORY ADDRESSES

(75) Inventors: Sheng Hung Wang, San Diego, CA (US); Simon S. Kim, Vista, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 10/706,675

(22) Filed: Nov. 12, 2003

(65) Prior Publication Data
US 2004/0098525 A1 May 20, 2004

Related U.S. Application Data

(62) Division of application No. 09/691,391, filed on Oct. 18, 2000, now Pat. No. 6,691,193.

(51) Int. Cl.[7] .............................................. G06F 13/00
(52) U.S. Cl. ........................ 710/110; 710/113; 710/306
(58) Field of Search ................................ 710/100, 300, 710/306, 312–317, 110, 113

(56) References Cited

U.S. PATENT DOCUMENTS

| | | | | |
|---|---|---|---|---|
| 5,778,236 A | * | 7/1998 | Gephardt et al. | 710/266 |
| 6,081,874 A | * | 6/2000 | Carpenter et al. | 711/141 |
| 6,182,178 B1 | * | 1/2001 | Kelley et al. | 710/314 |
| 6,247,100 B1 | * | 6/2001 | Drehmel et al. | 711/141 |
| 6,260,093 B1 | * | 7/2001 | Gehman et al. | 710/309 |
| 6,496,890 B1 | * | 12/2002 | Azevedo et al. | 710/110 |
| 6,567,881 B1 | * | 5/2003 | Mojaver et al. | 710/313 |
| 6,587,961 B1 | * | 7/2003 | Garnett et al. | 714/11 |

* cited by examiner

Primary Examiner—Tim Vo
(74) Attorney, Agent, or Firm—Blakely, Sokoloff, Taylor & Zafman LLP (57) ABSTRACT

In one embodiment of the present invention, a slave interface circuit includes a slave access circuit and a slave bus decoder. The slave access circuit provides access to the one of P slave devices from one of N master processors via a system bus controller and K slave buses. The K slave buses are configured to couple to the P slave devices. The system bus controller dynamically maps address spaces of the P slave devices. The slave bus decoder enables the one of the P slave devices to connect to one of the K slave buses when the one of the P slave devices is addressed by the one of the N master processors. The slave bus decoder is controlled by the system bus controller. In another embodiment of the present invention, the system bus controller includes an arbiter, a mapping circuit, and a switching circuit. The arbiter arbitrates access requests from N master processors via N master buses and generates arbitration signals. The mapping circuit stores mapping information to dynamically map an address space of K slave devices coupled to K slave buses based on the arbitration signals. The switching circuit connects the N master buses to K slave buses based on the arbitration signals and the mapping information.

9 Claims, 7 Drawing Sheets

| A | B | C | |
|---|---|---|---|
| 00 | 00 | XXXX | SLAVE 1 |
| 00 | 01 | XXXX | SLAVE 2 |
| | : | | : |
| 00 | 0(P-1) | XXXX | SLAVE P |
| | : | | : |
| 01 | 00 | XXXX | SLAVE 1 |
| 01 | 01 | XXXX | SLAVE 2 |
| | : | | : |
| 01 | 0(P-1) | XXXX | SLAVE P |
| | : | | : |
| 0(L-1) | 00 | XXXX | SLAVE 1 |
| 0(L-1) | 01 | XXXX | SLAVE 2 |
| | : | | : |
| 0(L-1) | 0(P-1) | XXXX | SLAVE P |
| | : | | : |

| | | | |
|---|---|---|---|
| 00 | 000 | XXXX | SLAVE 1 |
| 00 | 001 | XXXX | 2 |
| 00 | 010 | XXXX | 3 |
| 00 | 011 | XXXX | 4 |
| 00 | 100 | XXXX | 5 |
| 00 | 101 | XXXX | 6 |
| 00 | 110 | XXXX | 7 |
| 00 | 111 | XXXX | 8 |
| 01 | 000 | XXXX | SLAVE 1 |
| 01 | 001 | XXXX | 2 |
| 01 | 010 | XXXX | 3 |
| 01 | 011 | XXXX | 4 |
| 01 | 100 | XXXX | 5 |
| 01 | 101 | XXXX | 6 |
| 01 | 110 | XXXX | 7 |
| 01 | 111 | XXXX | 8 |
| 10 | 000 | XXXX | SLAVE 1 |
| 10 | 001 | XXXX | 2 |
| 10 | 010 | XXXX | 3 |
| 10 | 011 | XXXX | 4 |
| 10 | 100 | XXXX | 5 |
| 10 | 101 | XXXX | 6 |
| 10 | 110 | XXXX | 7 |
| 10 | 111 | XXXX | 8 |
| 11 | 000 | XXXX | SLAVE 1 |
| 11 | 001 | XXXX | 2 |
| 11 | 010 | XXXX | 3 |
| 11 | 011 | XXXX | 4 |
| 11 | 100 | XXXX | 5 |
| 11 | 101 | XXXX | 6 |
| 11 | 110 | XXXX | 7 |
| 11 | 111 | XXXX | 8 |

- SLAVE BLOCK $550_1$ TO SLAVE BUS 1 (rows 00)
- SLAVE BLOCK $550_2$ TO SLAVE BUS 2 (rows 01)
- SLAVE BLOCK $550_3$ TO SLAVE BUS 3 (rows 10)
- SLAVE BLOCK $550_4$ TO SLAVE BUS 4 (rows 11)

FIG.5B

|  | SLAVE DEVICE | | | | | | | |
|---|---|---|---|---|---|---|---|---|
|  | 1 | 2 | 3 | 4 | 5 | 6 | 7 | 8 |
|  | D₁D₀E | D₁D₀E | D₁D₀E | D₁D₀E | D₁D₀E | D₁D₀E | D₁D₀E | D₁D₀E |
| 00 000 | 000 | XX1 | XX1 | XX1 | XX1 | XX1 | XX1 | XX1 |
| 00 001 | XX1 | 000 | XX1 | XX1 | XX1 | XX1 | XX1 | XX1 |
| 00 010 | XX1 | XX1 | XX1 | XX1 | XX1 | XX1 | XX1 | XX1 |
| 00 011 | XX1 | XX1 | XX1 | 000 | XX1 | XX1 | XX1 | XX1 |
| 00 100 | XX1 | XX1 | XX1 | XX1 | 000 | XX1 | XX1 | XX1 |
| 00 101 | XX1 | XX1 | XX1 | XX1 | XX1 | XX1 | XX1 | XX1 |
| 00 110 | XX1 | XX1 | XX1 | XX1 | XX1 | XX1 | XX1 | XX1 |
| 00 111 | XX1 | XX1 | XX1 | XX1 | XX1 | XX1 | XX1 | XX1 |
| 01 000 | XX1 | XX1 | XX1 | XX1 | XX1 | XX1 | XX1 | XX1 |
| 01 001 | XX1 | XX1 | XX1 | XX1 | XX1 | XX1 | XX1 | XX1 |
| 01 010 | XX1 | XX1 | 010 | XX1 | XX1 | XX1 | XX1 | XX1 |
| 01 011 | XX1 | XX1 | XX1 | XX1 | XX1 | XX1 | XX1 | XX1 |
| 01 100 | XX1 | XX1 | XX1 | XX1 | XX1 | XX1 | XX1 | XX1 |
| 01 101 | XX1 | XX1 | XX1 | XX1 | XX1 | 010 | XX1 | XX1 |
| 01 110 | XX1 | XX1 | XX1 | XX1 | XX1 | XX1 | XX1 | XX1 |
| 01 111 | XX1 | XX1 | XX1 | XX1 | XX1 | XX1 | XX1 | 010 |
| 10 000 | XX1 | XX1 | XX1 | XX1 | XX1 | XX1 | XX1 | XX1 |
| 10 001 | XX1 | XX1 | XX1 | XX1 | XX1 | XX1 | XX1 | XX1 |
| 10 010 | XX1 | XX1 | XX1 | XX1 | XX1 | XX1 | XX1 | XX1 |
| 10 011 | XX1 | XX1 | XX1 | XX1 | XX1 | XX1 | XX1 | XX1 |
| 10 100 | XX1 | XX1 | XX1 | XX1 | XX1 | XX1 | XX1 | XX1 |
| 10 101 | XX1 | XX1 | XX1 | XX1 | XX1 | XX1 | XX1 | XX1 |
| 10 110 | XX1 | XX1 | XX1 | XX1 | XX1 | XX1 | XX1 | XX1 |
| 10 111 | XX1 | XX1 | XX1 | XX1 | XX1 | XX1 | XX1 | XX1 |
| 11 000 | XX1 | XX1 | XX1 | XX1 | XX1 | XX1 | XX1 | XX1 |
| 11 001 | XX1 | XX1 | XX1 | XX1 | XX1 | XX1 | XX1 | XX1 |
| 11 010 | XX1 | XX1 | XX1 | XX1 | XX1 | XX1 | XX1 | XX1 |
| 11 011 | XX1 | XX1 | XX1 | XX1 | XX1 | XX1 | XX1 | XX1 |
| 11 100 | XX1 | XX1 | XX1 | XX1 | XX1 | XX1 | XX1 | XX1 |
| 11 101 | XX1 | XX1 | XX1 | XX1 | XX1 | XX1 | XX1 | XX1 |
| 11 110 | XX1 | XX1 | XX1 | XX1 | XX1 | XX1 | 110 | XX1 |
| 11 111 | XX1 | XX1 | XX1 | XX1 | XX1 | XX1 | XX1 | XX1 |

EFFICIENT BUS UTILIZATION IN A MULTIPROCESSOR SYSTEM BY DYNAMICALLY MAPPING MEMORY ADDRESSES

CROSS-REFERENCES TO RELATED APPLICATIONS

This is a Divisional Application of U.S. patent application Ser. No. 09/691,391, filed Oct. 18, 2000 now U.S. Pat. No. 6,691,193. This Divisional Application claims the benefit of the U.S. patent application Ser. No. 09/691,391.

BACKGROUND

1. Field of the Invention

This invention relates to computer architecture. In particular, the invention relates to multiprocessor systems.

2. Description of Related Art

In a multiprocessor system, several processors are connected to a bus to communicate with each other and with other devices. A processor that has control of the bus is referred to as a master. Examples of a master include central processing unit (CPU), digital signal processor (DSP), and direct memory access (DMA) controller. A device that can only respond to a bus operation (e.g., read, write) initiated by a master is referred to as a slave. Examples of a slave include memory device, serial input/output device, and universal asynchronous receiver and transceiver (UART).

In a typical multiprocessor system, there are several masters and slaves. The masters usually have to compete for the use of the bus. When a master is using the bus, other masters have to wait. The problem is even more severe when several masters want to access several slaves at the same time.

Therefore, there is a need to have a technique to utilize the bus efficiently.

SUMMARY

The present invention is a method and apparatus to provide efficient access to multiple slave devices via a plurality of slave buses. In one embodiment of the present invention, a slave interface circuit is coupled between one of P slave devices and K slave buses. The slave interface circuit includes a slave access circuit and a slave bus decoder. The slave access circuit provides access to the one of P slave devices from one of N master processors via a system bus controller and K slave buses. The K slave buses are configured to couple to the P slave devices. The system bus controller dynamically maps address spaces of the P slave devices. The slave bus decoder enables the one of the P slave devices to connect to one of the K slave buses when the one of the P slave devices is addressed by the one of the N master processors. The slave bus decoder is controlled by the system bus controller. In another embodiment of the present invention, the system bus controller includes an arbiter, a mapping circuit, and a switching circuit. The arbiter arbitrates access requests from N master processors via N master buses and generates arbitration signals. The mapping circuit stores mapping information to dynamically map an address space of P slave devices coupled to K slave buses based on the arbitration signals. The switching circuit connects the N master buses to K slave buses based on the arbitration signals and the mapping information.

BRIEF DESCRIPTION OF THE DRAWINGS

The features and advantages of the present invention will become apparent from the following detailed description of the present invention in which.

DESCRIPTION

The present invention is a technique to provide efficient access to slave devices by multiple master processors. Accessing the slave devices is carried out via a number of slave buses. A system bus controller is interfaced between the master processor buses and the slave buses to allow any one of the master processors to access to any one of the slave buses. Each of the slave devices is connected to all the slave buses via an interface circuit. The system bus controller has a mapping circuit to dynamically map the address space of the slave devices according to mapping information. The mapping information is updated by a supervisor processor.

In the following description, for purposes of explanation, numerous details are set forth in order to provide a thorough understanding of the present invention. However, it will be apparent to one skilled in the art that these specific details are not required in order to practice the present invention. In other instances, well-known electrical structures and circuits are shown in block diagram form in order not to obscure the present invention.

Figure 1:
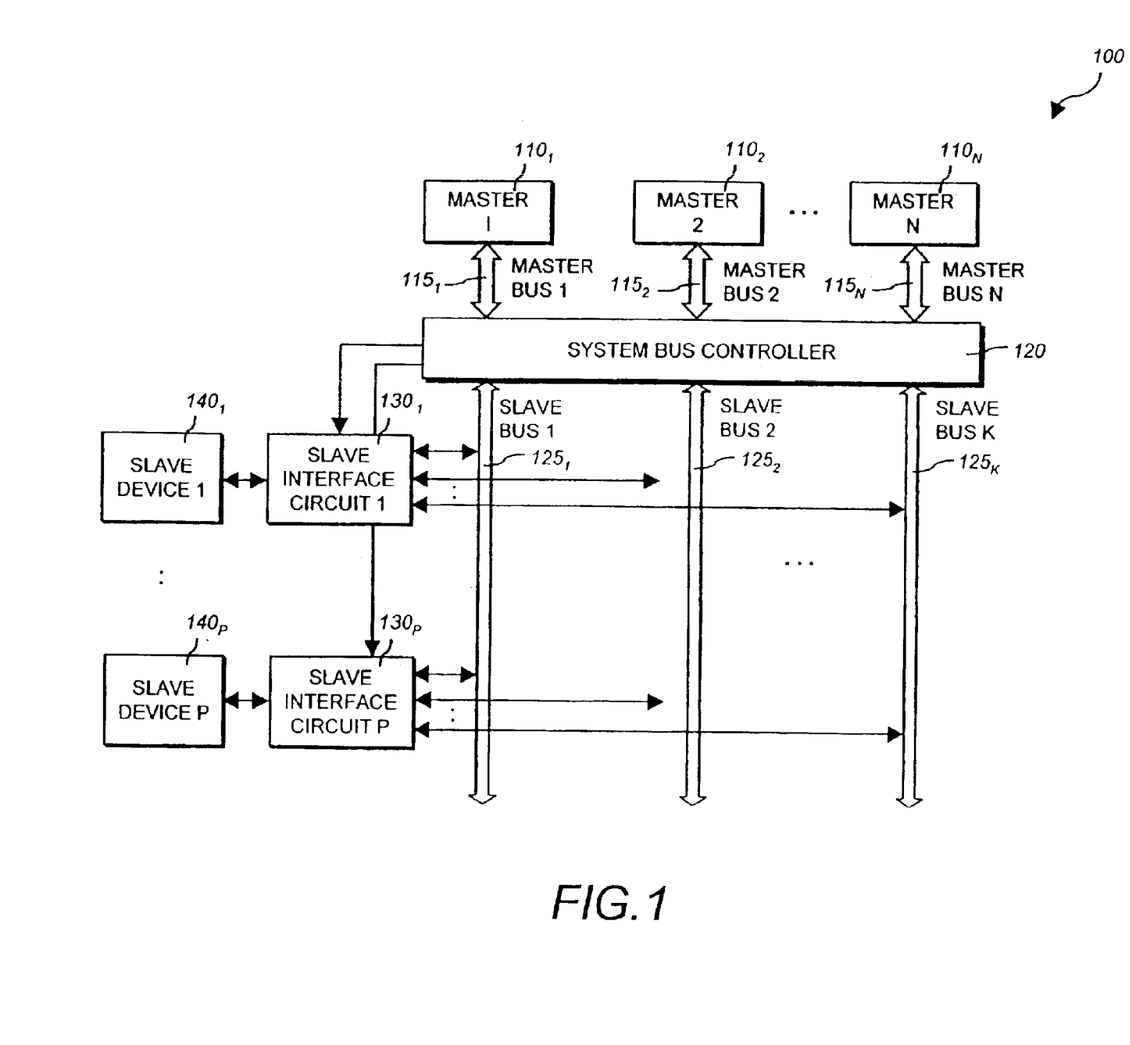
FIG. 1 is a diagram illustrating a system in which one embodiment of the invention can be practiced.

FIG. 1 is a diagram illustrating a system 100 in which one embodiment of the invention can be practiced. The system 100 includes N master processors $110_1$ to $110_N$, N master buses $115_1$ to $115_N$, a system bus controller 120, K slave buses $125_1$ to $125_K$, P slave interface circuits $130_1$ to $130_P$, and P slave devices $140_1$ to $140_P$.

Each of the N processors $110_1$ to $110_N$ is coupled to each of the N master buses $115_1$ to $115_N$, respectively. The master processors $110_1$ to $110_N$ are any processors that are capable of controlling their corresponding buses master buses $115_1$ to $115_N$. The ability to control the bus includes asserting mastership, issuing access control signals (e.g., read and write), issuing address and data, etc. A processor that can have control of a bus is referred to as a master. A device that can only receive information on the bus is referred to as a slave. Examples of the processors $110_1$ to $110_N$ include microprocessor, digital signal processor, micro-controller, direct memory access (DMA) controller, etc. Examples of a slave include memory devices, peripheral devices (e.g., serial communication, parallel input/output devices). The N master buses $115_1$ to $115_N$ may be homogeneous or heterogeneous depending on the type of the corresponding N processors $110_1$ to $110_N$. Examples of include the Peripheral Interconnect Component (PCI) bus, the Industry Standard Adapter (ISA), or any specially designed bus.

The system bus controller 120 is interfaced between the N master buses $115_1$ to $115_N$ and the K slave buses $125_1$ to $125_K$. The system bus controller 120 controls the access to the P slave devices $140_1$ to $140_P$ from the N master processors $110_1$ to $110_N$ by dynamically mapping the address spaces of the P slave devices $140_1$ to $140_P$ according to the system access requests. Through the system bus controller 120, any one of the N processors $110_1$ to $110_N$ can access to any one of the P slave devices $140_1$ to $140_P$. The system bus controller 120 arbitrates all the access requests from the to resolve any access conflicts. The arbitration may be based on some predefined, or static, priority, variable, or dynamic, priority, or a combination of both static and dynamic priorities. The system bus controller 120 also switches the appropriate connections to connect the N master buses $115_1$ to $115_N$ to the K slave buses $125_1$ to $125_K$ dynamically according to current system demands and access requests. In addition, the system bus controller 120 generates control signals to the P slave interface circuits $130_1$ to $130_P$ to enable the connection of the corresponding slave devices to the K slave buses $125_1$ to $125_K$.

The K slave buses $125_1$ to $125_K$ provide access to the P slave devices $140_1$ to $140_P$. The K slave buses $125_1$ to $125_K$ may be homogenous or heterogeneous, and are compatible to all the P slave devices $140_1$ to $140_P$. The P slave interface circuits $130_1$ to $130_P$ are circuits that provide interface between each of the P slave devices $140_1$ to $140_P$ to the K slave buses $125_1$ to $125_K$.

Figure 2:
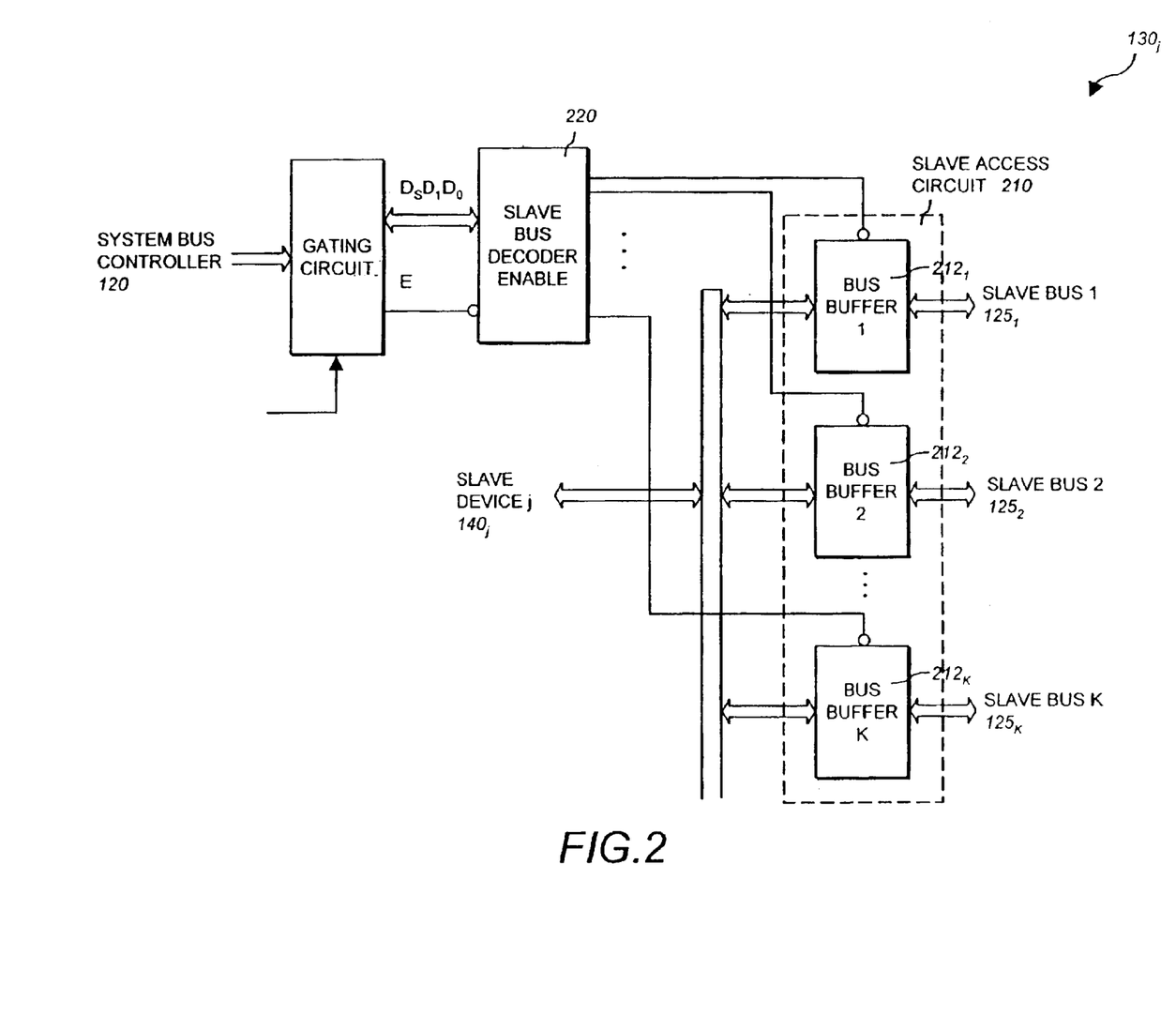
FIG. 2 is a diagram illustrating a slave interfacing circuit shown in FIG. 1 according to one embodiment of the invention.

FIG. 2 is a diagram illustrating a slave interfacing circuit 130j shown in FIG. 1 according to one embodiment of the invention. The slave interfacing circuit 130j includes a slave access circuit 210, a slave bus decoder 220, and a gating circuit 230.

The slave access circuit 210 is connected to the slave device 140j and the K slave buses $125_1$ to $125_K$ to provide access to the slave device 140j from one of the N master processors $110_1$ to $110_N$ via the system bus controller 120. The slave access circuit includes K bus buffers $212_1$ to $212_K$ which are connected to the K slave buses $125_1$ to $125_K$, respectively. Each of the K bus buffers $212_1$ to $212_K$ is enabled by the slave bus decoder 220. In one embodiment, the enablement of the K bus buffers $212_1$ to $212_K$ is mutually exclusive such that at any time at most one of the K bus buffers $212_1$ to $212_K$ is enabled. In other words, at any time, the slave device 140j is connected to at most one of the K slave buses $125_1$ to $125_K$. Since any one of the K bus buffers $212_1$ to $212_K$ can be enabled by the slave bus decoder 220 under the control of the bus controller 120, the slave device 140j can be connected to any one of the K slave buses $125_1$ to $125_K$.

The slave bus decoder 220 is coupled to the slave access circuit 210 to enable the slave device 140j to connect to one of the K slave buses $125_1$ to $125_K$ when the slave device 140j is addressed by one of the N master processors $110_1$ to $110_N$. The slave bus decoder 220 is controlled by the system bus controller 120. The slave bus decoder 220 may be implemented as a S-to-$2^S$ decoder having S inputs $D_0, D_1, \ldots, D_S$, and an enable input E. When E is asserted active, e.g., LOW, the slave bus decoder 220 generates an active output corresponding to the S inputs. When E is de-asserted inactive, e.g., HIGH, the slave bus decoder 220 is disabled and generates all inactive outputs (e.g., HIGH) which disables all the bus buffers $212_1$ to $212_K$. The S and E inputs are provided by the bus controller 120 (FIG. 1). Note that an alternative embodiment is to combine the slave bus decoder 220 with the gating circuit 230 in a composite decoding circuit.

The gating circuit 230 receives the control signals provided by the bus controller 120. The control signals include N group of signals. Each group of signals corresponds to a master processor. The gating circuit 230 may be implemented as a multiplexer that route the control signals of the master processor that has control of the slave device to a slave bus so that its decoder inputs can be selected. This can be further explained in the example shown in FIGS. 5A through 5C.

Figure 3:
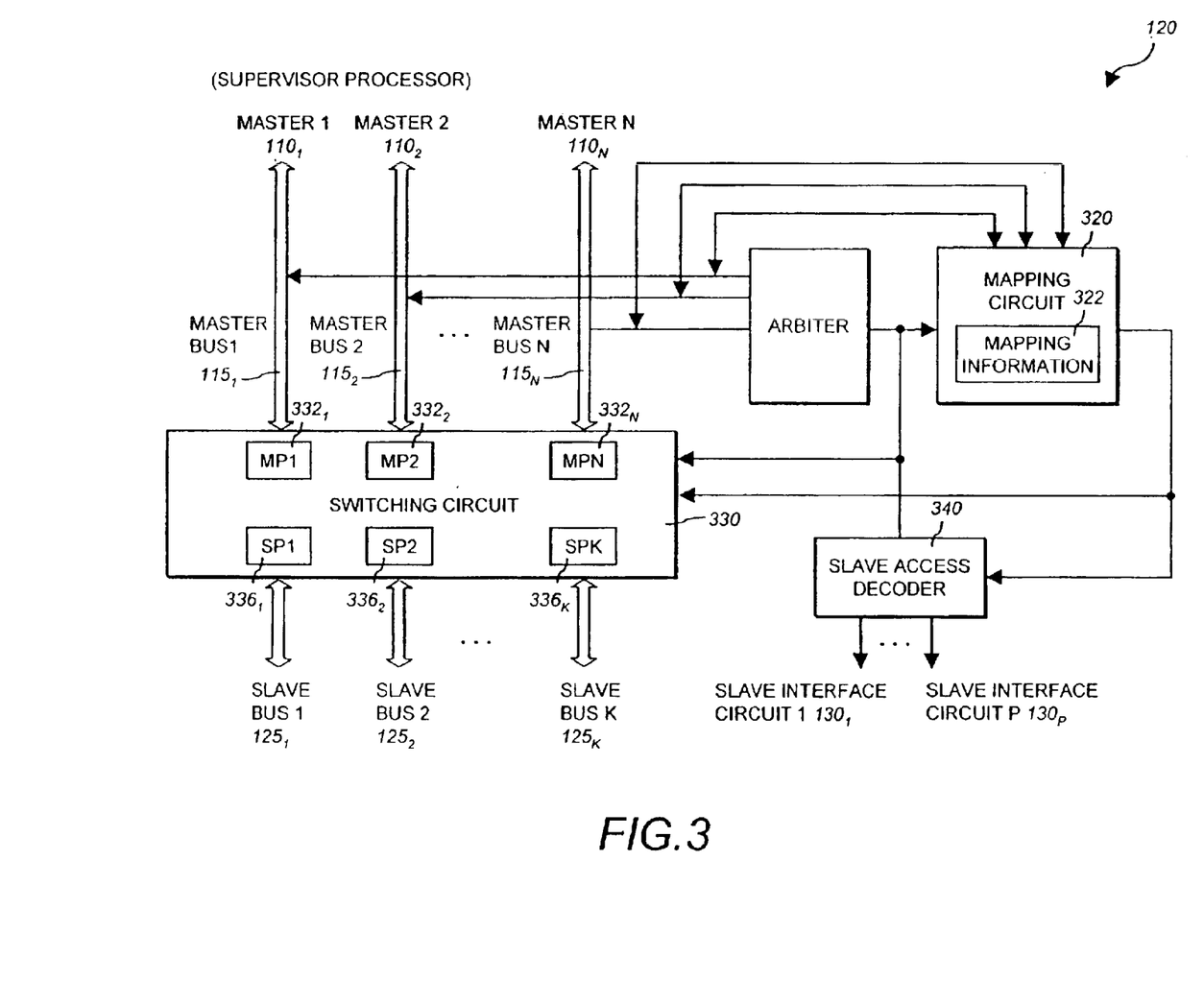
FIG. 3 is a diagram illustrating a system bus controller shown in FIG. 1 according to one embodiment of the invention.

FIG. 3 is a diagram illustrating the system bus controller 120 shown in FIG. 1 according to one embodiment of the invention. The system bus controller 120 includes an arbiter 310, a mapping circuit 320, a switching circuit 330, and a slave access decoder 340.

The arbiter 310 arbitrates the access requests from the N master processors via the N master buses. The arbiter 310 generates arbitration signals as result of the arbitration. The arbitration signals indicate which master processor is given access to the slave device if there is access conflict. The corresponding master processors are informed of the arbitration so that it can proceed with the access if the access is granted, or attempt to access again if the access is denied.

The mapping circuit 320 store mapping information 322 to dynamically map the address space of the K slave devices according to system requirements and access requests. The mapping information 322 is updated by a supervisor processor in the system. This supervisor processor may be an external processor or one of the N master processors $110_1$ to $110_N$. In the illustrative example shown in FIG. 3, the master processor $110_1$ is designated as the supervisor processor. The mapping information 322 may be stored in a memory which occupies at a designated location. This memory may be a random access memory (RAM), a flash memory, or any read/write memory. Other master processors can also access the memory information 322 so that access data can be obtained. The mapping circuit 320 generate control signals to the switching circuit 330 and the slave access decoder 340. The mapping circuit 320 may also pass the relevant master bus signals to the slave address decoder 340.

The switching circuit 330 is coupled to the arbiter 310 and the mapping circuit 320 to connect the N master $115_1$ to $115_N$ to the K slave buses $125_1$ to $125_K$ based on the arbitration signals and the mapping information. The switching circuit 330 includes N master ports $332_1$ to $332_N$ and K slave ports 3361 to 336K. Each of the master and slave ports may be a buffer device or a multiplexer that can be enabled to connect to corresponding bus. The switching circuit 330 NK data paths to connect any of the N master ports to the any of the K slave ports. A decoding logic circuit is used to assure that path conflict is avoided.

The slave access decoder 340 decodes the addresses issued by the N master processors $110_1$ to $110_N$, either directly or via the mapping circuit 320. The slave access decoder 340 generates control signals to the P slave interface circuits $130_1$ to $130_P$ For each slave interface circuit, there is a set of control signals to ensure that at any time, at most one slave device is allowed to connected to one of the K slave buses $125_1$ to $125_K$.

Figure 4:
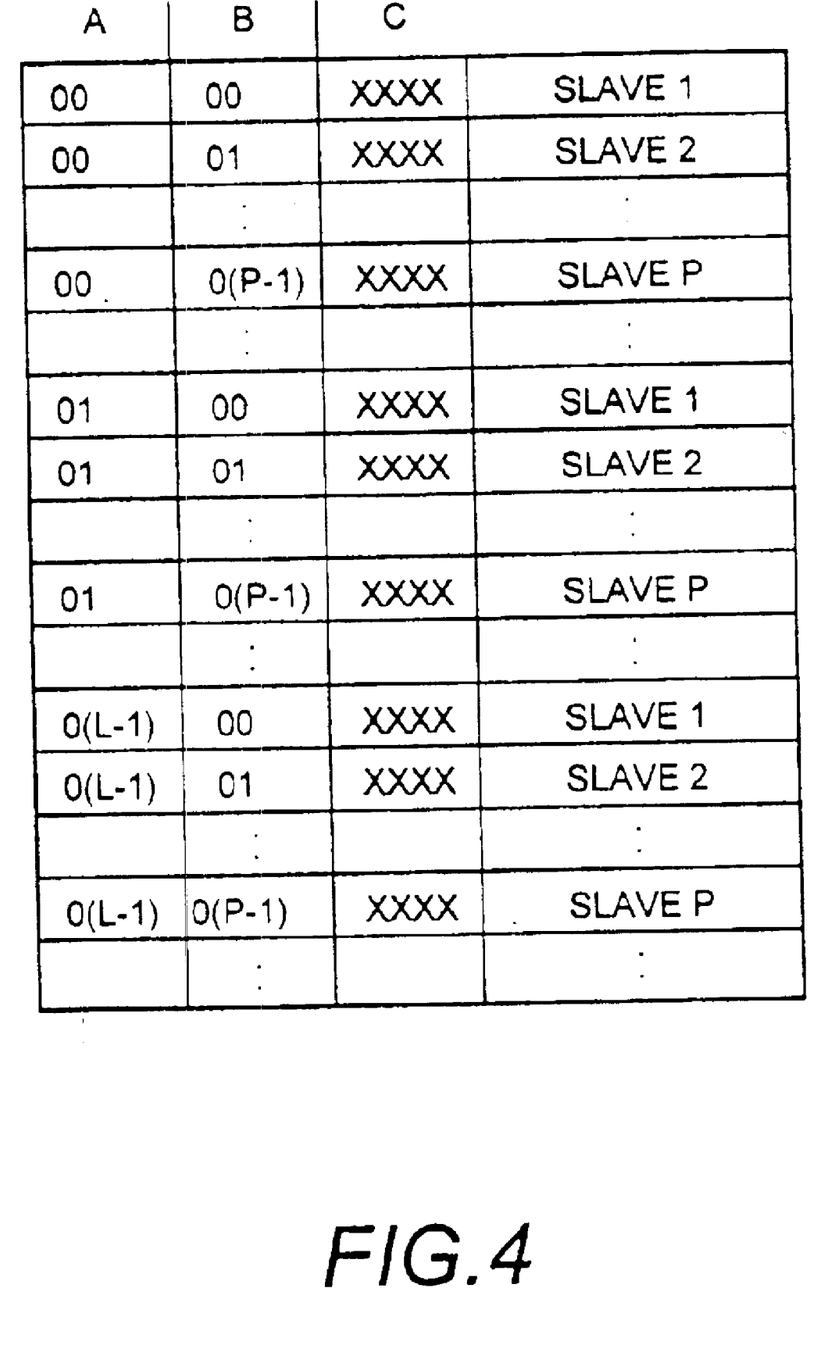
FIG. 4 is a diagram illustrating a memory map for the slave devices according to one embodiment of the invention.

FIG. 4 is a diagram illustrating a memory map for the slave devices according to one embodiment of the invention.

The address map shows the possible mapping of the slave devices to occupy the address space of each of the master processors $110_1$ to $110_N$. The memory space is divided into L address blocks. Each address block provides memory spaces for the P slave devices $140_1$ to $140_P$. The address field of each of the slave device is divided into three fields: A, B, and C. Field A is provided by the mapping information 322 as determined by the supervisor processor. Field B is provided by the slave address decoder 340 (FIG. 3) to select individual slave device within each address block.

Figure 5A:
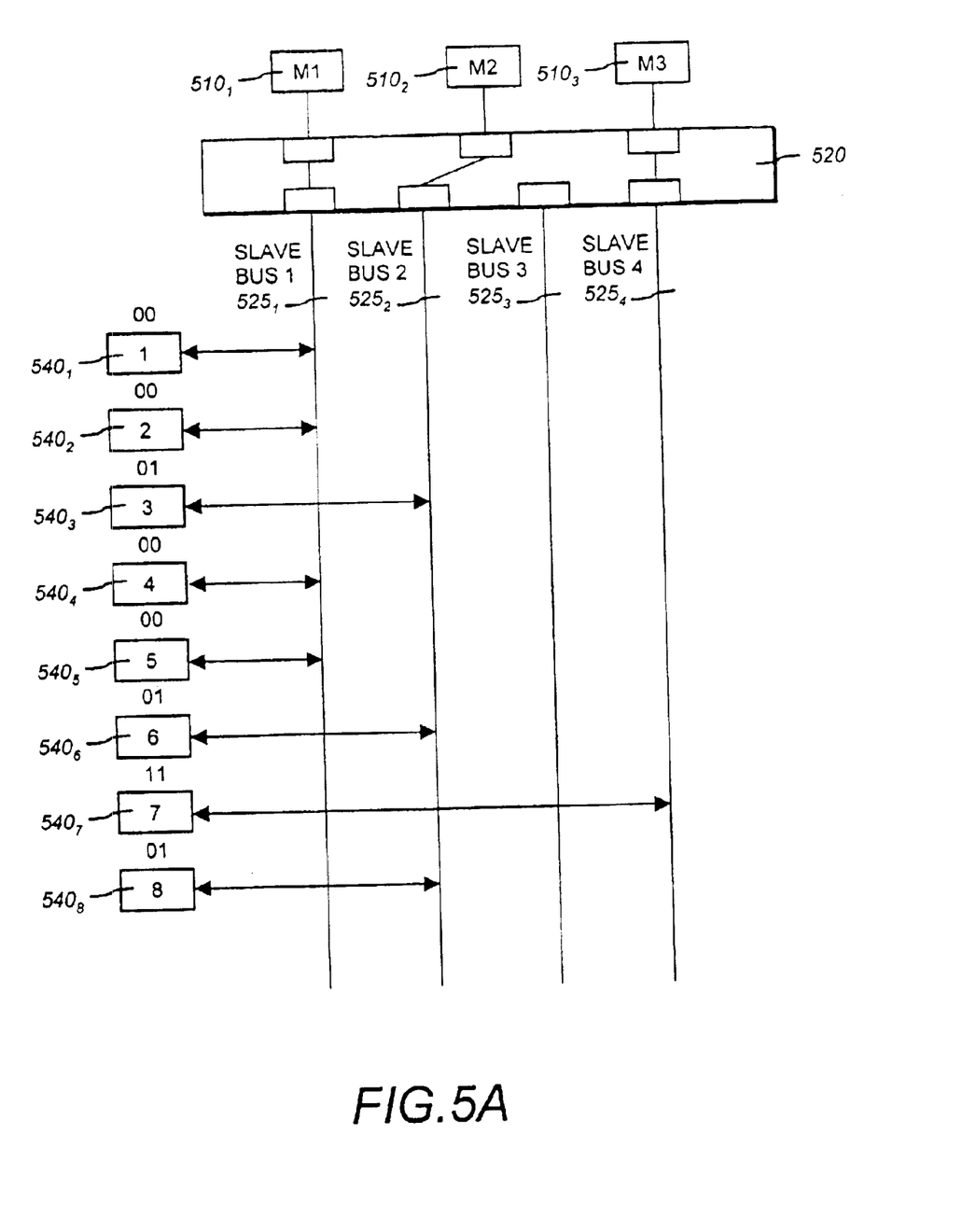
FIG. 5A is a diagram illustrating an example of a system according to one embodiment of the invention.

FIG. 5A is a diagram illustrating an example of a system 500 according to one embodiment of the invention. For simplicity and clarity, only the relevant elements are shown. The system 500 includes three master processors $510_1$ to $510_3$, a bus controller 520, 4 slave buses $525_1$ to $525_4$, and 8 slave devices $540_1$ to $540_8$. For clarity, the slave interface circuits are not shown.

In this example, suppose it is decided that slave devices 1, 2, 4, and 5 are assigned to slave bus 1; slave devices 3, 6, and 8 are assigned to slave bus 2; and slave device 7 is assigned to slave bus 4. In this example, slave bus 3 is not used. Suppose that after arbitration, master processor 1 has control of the slave bus 1, master processor 2 has control of slave bus 2, and master processor 3 has control of slave bus 4. From s slave device's point of view, it does not know which master processor is in control of the slave bus that it is connected to. The bus controller 520 performs the connecting of the master buses to the appropriate slave buses via the slave ports. In addition, the supervisor processor, say the master processor $510_1$ updates the mapping information in the mapping circuit to reflect this assignment and memory mapping.

Figure 5B:
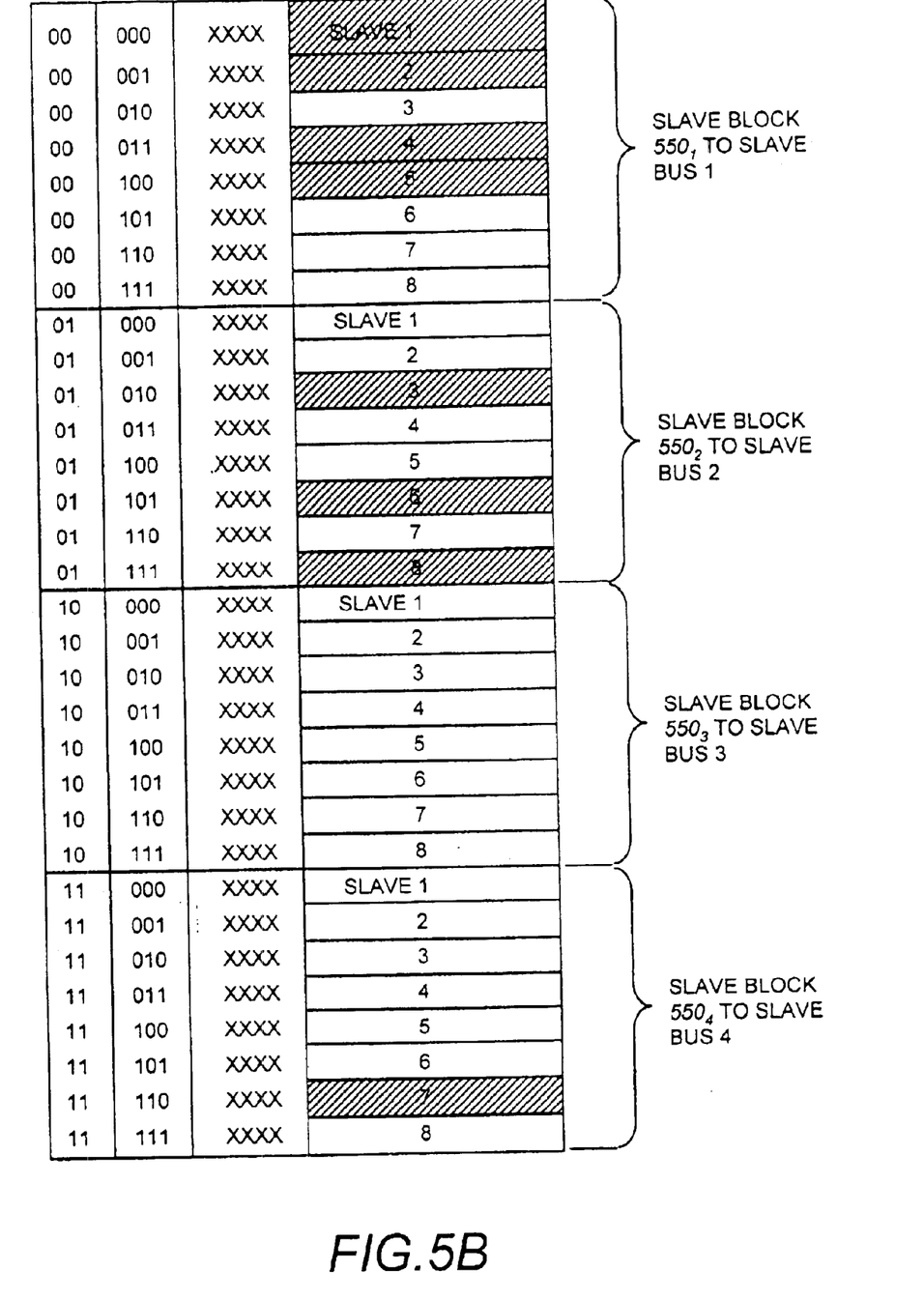
FIG. 5B is a diagram illustrating a memory map for the system shown in FIG. 5A according to one embodiment of the invention.

FIG. 5B is a diagram illustrating a memory map for the system shown in FIG. 5A according to one embodiment of the invention.

Suppose that each slave device occupies an address range of 64K. Then, field A is used to allocate the 8 slave devices to the 4 slave buses by assigning the 8 slave devices in a slave block. Therefore, field A has at least 2 bits. Field B is used to allocate each of the 8 slave devices to the corresponding slave block. Therefore, field B has at least 3 bits. Field C is used to allocate the address range of 64K for each slave device. Therefore, filed C has 16 bits. The entire memory space has a minimum size of 64K×4×8=2M address range. If more than 2M address space is used, there will be gaps or unused memory sub-spaces.

The memory space is divided into 4 memory blocks $550_1$ to $550_4$ corresponding to slave buses 1 to 4 $525_1$ to $525_4$, respectively. Slave block $550_1$ occupies the memory address range from 00 000 xx . . . xx to 00 111 xx . . . xx (in binary), where x indicates don't cares and is 16-bit. Similarly, slave blocks 5502 to 5504 occupy memory address ranges from 01 000 xx . . . xx to 01 111 xx . . . xx, from 10 000 xx . . . xx to 10 111 xx . . . xx, and from 11 000 xx . . . xx to 11 111 xx . . . xx, respectively. The cross-hatched memory range indicates the memory address range occupied by the slave device as assigned.

Figure 5C:
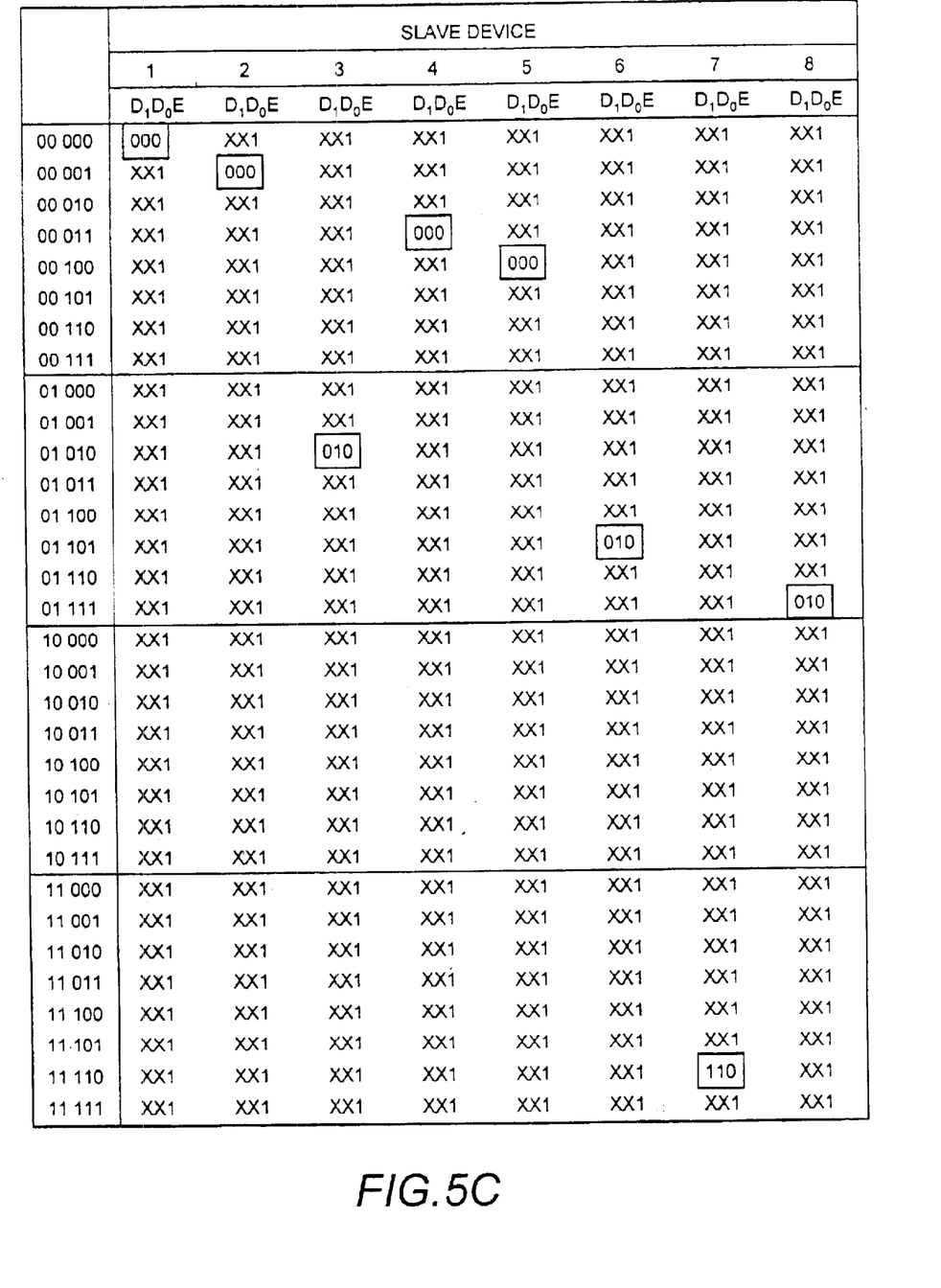
FIG. 5C is a diagram illustrating a truth table for the slave access decoder for the memory map shown in FIG. 5B according to one embodiment of the invention.

FIG. 5C is a diagram illustrating a truth table for the slave access decoder for the memory map shown in FIG. 5B according to one embodiment of the invention.

In this example, the slave access decoder 340 (FIG. 3) may be implemented as a set of three look-up tables, each look-up table corresponding to each master. The look-up table may be implemented by a random access memory, or an re-configurable programmable logic circuit. The address to the look-up table is the upper address bits of the memory space shown in FIG. 5B, i.e., fields A and B. The outputs of the look-up table are the control signals connected to all 8 slave bus decoder $220_1$ to $220_8$ as shown as the element 220 in FIG. 2. In addition, at each slave device there is a gating circuit to gate the control signals according to which master is in control of which slave bus.

Since each slave bus decoder has 2 decode inputs and one enable input, for eight slave devices, there are 8×3=24 control signals. These control signals form into eight group, each group goes to each slave device and consists of three bits $D_1$ $D_0$ E where $D_1$ $D_0$ are the decoder inputs and E is the enable input to the 2-to-4 slave bus decoder 220. When the E input of a slave bus decoder is de-asserted HIGH, the corresponding slave device is disconnected from all the slave buses because all the bus buffers are disabled, or become high impedance. In this case, the $D_1$ $D_0$ inputs become don't care.

The contents of the look-up tables shown in FIG. 5C are an abstract representation of all three look-up tables, where x indicates don't cares. There are twenty-four bits total divided into eight groups of three bits. Each group goes to each slave device. If a master processor generates an address that does not correspond to the slave device that can be connected to the slave bus under its control, there will be an error. For example, if master 1 generates an address 11 001 xx . . . xx, there will be an error.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. An apparatus comprising:
    a slave access circuit coupled to one of P slave devices and K slave buses to provide access to the one of the P slave devices from one of N master processors via a system bus controller, the K slave buses being configured to couple to the P slave devices, the system bus controller interfacing to the N master processors via N master buses and dynamically mapping address spaces of the P slave devices; and
    a slave bus decoder coupled to the slave access circuit to enable the one of the P slave devices to connect to one of the K slave buses when the one of the P slave devices is addressed by the one of the N master processors, the slave bus decoder being controlled by the system bus controller.

2. The apparatus of claim 1 wherein the slave access circuit comprises:
    K bus buffers coupled to the K slave buses to buffer bus signals corresponding to access signals to the one of the P slave devices, the K bus buffers being enabled by the slave bus decoder.

3. The apparatus of claim 2 wherein each of the K bus buffers is connected to each of the K slave buses.

4. A method comprising:
    providing access to one of the P slave devices from one of N master processors via a system bus controller and K slave buses, the K slave buses being configured to couple to the P slave devices, the system bus controller interfacing to the N master processors via N master buses;
    dynamically mapping address spaces of the P slave devices by the bus controller;
    enabling the one of the P slave devices to connect to one of the K slave buses by a slave bus decoder when the one of the P slave devices is addressed by the one of the N master processors; and
    controlling the slave bus decoder by the system bus controller.

5. The method of claim 4 wherein providing access comprises:

buffering bus signals corresponding to access signals to the one of the P slave devices by K bus buffers; and enabling the K bus buffers by the slave bus decoder.

6. The method of claim 5 wherein buffering the bus signals comprises:

connecting each of the K bus buffers to each of the K slave buses.

7. A system comprising:

a system bus controller coupled to N master processors via N master buses and K slave buses;

P slave devices; and

P slave interface circuits coupled to the P slave devices and the K slave buses, each of the P slave interface circuits comprising:

a slave access circuit coupled to one of the P slave devices and the K slave buses to provide access to the one of the P slave devices from one of the N master processors via the system bus controller, the K slave buses being configured to couple to the P slave devices, the system bus controller dynamically mapping address spaces of the P slave devices, and a slave bus decoder coupled to the slave access circuit to enable the one of the P slave devices to connect to one of the K slave buses when the one of the P slave devices is addressed by the one of the N master processors, the slave bus decoder being controlled by the system bus controller.

8. The system of claim 7 wherein the slave access circuit comprises:

K bus buffers coupled to the K slave buses to buffer bus signals corresponding to access signals to the one of the P slave devices, the K but buffers being enabled by the slave bus decoder.

9. The system of claim 8 wherein each of the K bus buffers is connected to each of the K slave buses.

* * * * *